Patented Sept. 26, 1944

2,359,242

UNITED STATES PATENT OFFICE 2,359,242

PREPARATION OF PHENOL-KETONE CONDENSATION PRODUCTS

Ralph P. Perkins and Fred Bryner, Midland, Mich., assignors to The Dow Chemical Company, Midland, Mich., a corporation of Michigan No Drawing. Application August 23, 1941, Serial No. 408,068

16 Claims. (Cl. 260—619)

This invention concerns an improved method of reacting phenols with ketones to form phenol-ketone condensation products, particularly bis-phenols, and certain new condensation products thereby obtainable. The "bis-phenols" with which the invention is concerned contain an aliphatic radical having a single secondary carbon atom thereof attached to the aromatic nuclei of two phenolic radicals. The invention particularly concerns a method and certain agents for promoting the chemical condensation of phenols with ketones to form bis-phenols.

Bis-phenols are commonly formed by reacting phenols with ketones in the presence of acidic condensing agents, e. g. concentrated sulphuric or hydrochloric acid, etc. The reaction conditions, with respect to temperature and the kinds and proportions of reactants and acid condensing agent, may be varied widely and still form the bis-phenols in fair yield. However, such condensation reactions usually occur quite slowly and by-products which are difficultly separable from the desired bis-phenol are often formed in substantial amount. The reaction conditions required to carry such condensation out in reasonably short time and to produce the bis-phenol in good yield and in readily purifiable form are usually quite critical. In U. S. Patent No. 2,191,831 to one of us, it is shown that such condensation of phenol with acetone occurs most favorably when carried out at temperatures below 80° C., using at least 3 moles of phenol per mole of acetone and employing substantially anhydrous hydrogen chloride as the condensing agent. However, even under the most favorable reaction conditions as yet known, such reactions to produce bis-phenols are time-consuming. Certain phenols and ketones react together sluggishly or not at all.

We have discovered that sulphur and ionizable sulphur compounds containing a sulphur atom of apparent valence not greater than 2, may be used to promote the condensation of phenols with ketones. By an "ionizable sulphur compound" is meant a compound of sulphur which readily ionizes in the presence of water to yield an ion wherein the free valance is on the sulphur. Examples of ionizable sulphur compounds which may be used to promote the condensation reaction are sulphur monochloride; sulphur dichloride; sodium thiosulphate; potassium thiosulphate; hydrogen sulphide and compounds such as sodium, potassium or calcium sulphide which when added to the acidic reaction mixture will react to form hydrogen sulphide; mercaptans and thiophenols such as ethyl mercaptan, thiophenol, p-methylthiophenol, o-ethyl-thiophenol, thio-hydroquinone, thio-naphthol; thio-organic acids such as thio-acetic acid, thio-propionic acid, etc. It is probable that when elemental sulphur is used to promote the condensation of phenols with ketones, at least part of the sulphur reacts to form an ionizable sulphur compound (possibly a mercaptan or a thio-phenol) and that the sulphur compound is the actual promoter for the condensation, but this has not been established.

Such sulphur-containing substances, when added to a reaction mixture comprising a phenol, a ketone, and an acidic condensing agent cause a marked increase in the rate of condensation of the phenol with the ketone over that obtained under otherwise similar reaction conditions, but omitting the sulphur-containing substance. They also frequently permit carrying out of the condensation reaction at lower temperatures or more completely than would otherwise be possible. In some, if not all, instances the use of the sulphur-containing agent results in formation of the bis-phenol in more readily purifiable form than is obtained under otherwise similar conditions, but omitting the sulphur or sulphur compound. There are also a number of instances in which the sulphur-containing agents have been found to promote fairly rapid condensation between certain phenols and ketones which condense together only sluggishly or not at all if the sulphur-containing agent is omitted.

The sulphur-containing agents appear to catalyze the condensation of phenols with ketones under acid conditions and for convenience they will hereinafter be referred to as catalysts. However, the way in which they promote the condensation is not understood and they may have other functions.

Except for the requirement that a sulphur-containing catalyst be present, the reaction between phenols and ketones in the presence of acid-acting condensing agents may be carried out as usual. A strong mineral acid such as sulphuric acid, hydrochloric acid, hydrogen chloride, etc., is advantageously used as the condensing agent, but other acid-acting compounds, i. e. compounds which are hydrolyzed by water to form acids, such as aluminum chloride, sulphonyl chloride, phosgene, etc., may be used. Approximately 0.3 chemical equivalent or more of the condensing agent is usually employed per mole of the ketone reactant.

Also, the kinds and proportions of the phenol and ketone reactants may be varied widely. In some instances, particularly when one of the reactants is a solid, it may be desirable to carry the reaction out in the presence of an inert solvent therefor. However, as pointed out in U. S. Patent No. 2,191,831, the reaction usually occurs most favorably when carried out in the substantial absence of solvents other than the reactants at temperatures below 80° C. using a molecular excess of the phenol reactant and employing substantially anhydrous hydrogen chloride as the condensing agent. In practice, 4 moles or more of the phenolic reactant is preferably employed per mole of the ketone.

The sulphur-containing catalyst may be used in any desired proportion, but the rate of reaction usually becomes greater as the amount of catalyst is increased from a mere trace to a substantial proportion, e. g. 5 per cent by weight of the ketone. We usually employ the catalyst in amount corresponding to between 0.03 and 0.2 gram atom of sulphur per mole of the ketone reactant, but as just stated it may be used in smaller or considerably larger proportions.

The reactants, condensing agent and the sulphur-containing catalyst may be admixed in any desired order. Usually, it is convenient to mix the phenol and ketone reactants and thereafter to add the sulphur-containing catalyst and the condensing agent. When using hydrogen sulphide and gaseous hydrogen chloride as the catalyst and condensing agent, respectively, the reaction mixture may advantageously be saturated therewith.

The reaction is preferably carried out with stirring at the lowest temperature which will permit satisfactorily rapid reaction; usually at temperatures below 80° C. and in most instances below 40° C., e. g. at room temperature or lower. In some instances higher temperatures may be required. The time required for the completion of the reaction varies considerably with changes in the kinds of reactants and condensing agent employed, the kind and proportion of the sulphur-containing catalyst, the temperature at which the reaction is carried out, etc. The reaction has, in some instances, been carried nearly to completion in from 6 to 9 hours, but longer times are often required.

The reacted mixture usually has the odor of sulphur compounds and this may be removed by blowing steam through the mixture, preferably while maintaining the latter in molten condition at sub-atmospheric pressure. The bis-phenol product may be separated in any of the usual ways, e. g. by distilling therefrom unreacted phenol, water formed by the reaction, and the acid condensing agent if the latter is volatile; or by crystallization from a solvent such as dilute acetic acid, chlorobenzene, or ethylene dichloride, etc. In many instances, the separation and purification may advantageously be effected by the procedure described in U. S. Patent 2,182,308.

The following examples describe a number of ways in which the principle of the invention has been applied and illustrate certain of its advantages, but are not to be construed as limiting the invention.

Example 1

The purpose of this example is to illustrate the effectiveness of sulphur and various ionizable sulphur compounds, containing an ionizable sulphur atom of valence not exceeding 2, in promoting the acid condensation of phenol with acetone to form di-(4-hydroxy-phenyl)-dimethyl methane. In each of a series of experiments 376 grams (4 moles) of phenol and 58 grams (1 mole) of acetone were mixed and the mixture was cooled to a temperature between 18° and 20° C. In those runs wherein a sulphur-containing catalyst was employed, the catalyst named in the following table was added to the mixture in the amount given. The mixture was then stirred and maintained at temperatures between 18° and 20° C. by cooling while approximately 15 grams of anhydrous hydrogen chloride was fed into and absorbed by the mixture during a period of from 15 to 20 minutes. During and subsequent to addition of the hydrogen chloride reaction occurred. The time from the start of the addition of hydrogen chloride to the start of crystallization of the condensation product from the reaction mixture was noted and serves as a fairly accurate indication of the rate of the reaction. In each instance the reaction mixture was maintained at the above-mentioned temperatures with continued stirring for a period of time sufficient to permit consumption of 85 per cent or more of the acetone. The mixture was then washed with water and rendered substantially neutral by treatment with lime. Water and unreacted phenol were distilled from the mixture under vacuum. The residual bis-phenol product was blown with steam while under vacuum to remove odoriferous sulphur compounds therefrom. The table names the sulphur-containing catalyst employed in each experiment and gives the amount thereof used. It also gives the time from the start of the addition of hydrogen chloride to the mixture to the start of the crystallization of the condensation product from the mixture.

*Table I*

| Catalyst | | Crystallization time |
|---|---|---|
| Kind | Grams | |
| | | Minutes |
| None | | 170 |
| $H_2S$ | 2 | 25 |
| S | 2 | 80 |
| $Na_2S_2O_3$ | 2 | 107 |
| $S_2Cl_2$ | 8 | 90 |
| Tert.-butyl-mercaptan | 4 | 100 |

Example 2

The purpose of this example is to illustrate the effectiveness of hydrogen sulphide in promoting the acid condensation of various phenols with ketones. In each of a series of experiments the phenol and ketone named in the following table in the amounts given were mixed. In some instances a solvent also was added in the amount given. Hydrogen sulphide was then added while cooling and stirring the mixture, after which anhydrous hydrogen chloride was added in like manner. The resultant mixture was permitted to stand at the temperatures indicated in the table for the time given. The mixture was then diluted with chlorbenzol, heated when necessary to cause solution, and the resultant solution was washed thoroughly with water. The mixture was then treated with sufficient lime to neutralize any hydrogen chloride remaining therein, after which the chlorbenzol, unreacted phenol, and water were distilled from the mixture at about 25 mm. absolute pressure. In those runs wherein hydrogen sulphide had been employed as a reaction catalyst, the residual bis-phenol product was blown with steam while molten and under vacuum to remove any odoriferous sulphur compounds therefrom. Table II names the phenol and ketone reactants employed in each experiment and states the amount of each. It gives the grams of hydrogen sulphide and anhydrous hydrogen chloride used in each experiment, the average temperature at which the condensation reaction was carried out and also the maximum temperature developed during the reaction. The time required for completion of each reaction and the yield of bis-phenol product based on the ketone initially employed are given. The table also gives the freezing point of each bis-phenol product and its color.

The product of runs 15 and 16 is usually obtained as a red to brown resin. It was purified by crystallization from ortho-dichlorbenzene, whereby light brown crystals of 2.2-di-(4-hydroxyphenyl)-heptane, melting at 97°–99° C. and having probably the formula:

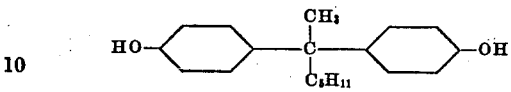

were obtained. Each of these new condensation products is useful as an intermediate agent which may be further condensed, e. g. with aldehydes, to form resins suitable for the preparation of molded articles, or lacquers and varnishes, etc.

Table II

| Run No. | Reaction mixture | | | | $H_2S$ gms. | HCl gms. | React. temp. | | React. time | Bis-phenol | | |
|---|---|---|---|---|---|---|---|---|---|---|---|---|
| | Phenol | | Ketone | | | | Av. | Max. | | Percent yield | F. P. °C. | Color |
| | Kind | Gram moles | Kind | Gram moles | | | °C. | °C. | | | | |
| 1 | Phenol | 12.5 | Methyl ethyl ketone | 3.12 | None | 45 | 20 | | 68 hrs | 87.1 | 115.8 | Brown. |
| 2 | do | 4 | do | 1 | 4 | 15 | 20 | 50 | 22 hrs | 97.5 | 122.8 | Nearly white. |
| 3 | do | 10.8 | Methyl isobutyl ketone | 2.6 | None | 42 | 20 | | 2 wks | 16.1 | 133 | Tan. |
| 4 | do | 4 | do | 1 | 4 | 15 | 20 | | 24 hrs | 69.5 | 146.8 | Light tan. |
| 5 | do | 4 | Cyclohexanone | 1 | None | 18 | 20 | 20 | 96 hrs | 60.2 | 156.8 | Tan. |
| 6 | do | 4 | do | 1 | 4 | 10.5 | 20 | 70 | 18 hrs | 78.3 | 183.2 | Light yellow. |
| 7 | do | 2 | Propiophenone | 0.5 | None | 8 | 20 | 20 | 5 days | 0 | | |
| 8 | do | 2 | do | 0.5 | 2 | 8 | 20 | 20 | 5 days | 69.5 | 160 | Red. |
| 9 | o-Cresol | 4 | Acetone | 1 | None | 15 | 40 | | 15 days | 95.7 | 120 | Light brown. |
| 10 | do | 4 | do | 1 | 4 | 15 | 20 | 27 | 23 hrs | 97.5 | 128.2 | Very light. |
| 11 | o-Phenylphenol[1] | 2 | do | 0.5 | None | 16.8 | 20 | 20 | 52 hrs | 19.1 | Resinous | Dark amber. |
| 12 | do[1] | 2 | do | 0.5 | 6.5 | 16.8 | 20 | 20 | 52 hrs | 84.0 | " | Amber. |
| 13 | o-Chloro phenol | 3 | do | 0.75 | None | 12 | 40 | | 2 wks | 20.2 | " | Brown. |
| 14 | do | 2 | do | 0.5 | 4 | 11.5 | 20 | 24 | 76 hrs | 13.9 | " | Red. |
| 15 | Phenol | 10.8 | Methyl n-amyl ketone | 2.6 | None | 52 | 20 | | 3 wks | 82.0 | " | Dark brown. |
| 16 | do | 4 | do | 1 | 4 | 15 | 20 | 40 | 6 hrs | 87.3 | " | Dark red. |

[1] 80 grams of acetic acid used as solvent.

The condensation reactions described in runs 8, 11–12 and 15–16 of Table II have not heretofore been known and the condensation products obtained in these runs are new. The product of run 8 was further purified by successive recrystallizations from toluene and chlorbenzene, respectively, whereby it was obtained in the form of amber crystals melting at 179.7°–180.2° C. It is probably 1-phenyl-1.1-di-(4-hydroxy-phenyl)-propane, having the formula:

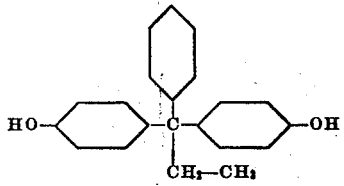

The product of runs 11–12 is usually obtained from the reaction in the form of a yellow to amber resin. When further purified, e. g. by recrystallization from chlorbenzene, it may be obtained in the form of white crystals melting at 99°–100° C. It is probably 2.2-di-(3-phenyl-4-hydroxy-phenyl)-propane, having the formula:

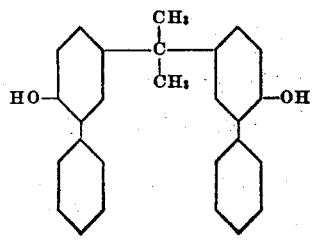

EXAMPLE 3

A mixture of 376.2 grams (4 moles) of phenol and 58 grams (1 mole) of acetone was cooled to 18° C. and 4 grams of hydrogen sulphide was added to and adsorbed by the same. The mixture was then treated with 100 cc. of an aqueous hydrochloric acid solution of 36 per cent by weight concentration and the resultant mixture was cooled with stirring to approximately 4° C. 30 grams of anhydrous hydrogen chloride gas was gradually added during a period of 1 hour and 20 minutes while maintaining the mixture at temperatures between 4° and 9° C. Rapid crystallization was observed approximately 25 minutes after all the hydrogen chloride had been added. The mixture was permitted to stand for 19.5 hours while maintaining the same at temperatures below 20° C. Approximately 166 cc. of chlorbenzol and 30 cc. of water were added and the mixture was heated to melt and dissolve the same. The aqueous acid layer was separated from the organic layer of the mixture. The organic layer was then washed, while warm and molten, with water. Water, chlorbenzene and unreacted phenol were distilled from the mixture while gradually reducing the pressure on the distilling system. The distillation was continued until the still residue was heated to approximately 175° C. at 25 mm. pressure. The molten residual bis-phenol product was blown with approximately 25 grams of steam while at temperatures between 165° and 175° C. and under a pressure of approximately 50 mm. absolute. As residue from these treatments there was obtained 223.5 grams (0.98 mole) of di-(4-hydroxyphenyl)-dimethyl-methane having a freezing point of 154.2° C. and a color of 150 A. P. H. A. The yield of said product was 98 per cent of theoretical, based on the acetone initially employed.

EXAMPLE 4

The experiment described in Example 3 was repeated, except that the hydrogen sulphide was omitted and the time of reaction was 26 hours. All other operating conditions were as set forth in Example 3. In this experiment crystallization of the bis-phenol product was not observable until about 4 hours after all of the hydrogen chloride had been added. The purified product had a freezing point of 152.2° C. and a color when molten of 500 A. P. H. A. The yield was 200 grams, or approximately 88 per cent of theoretical based on the acetone initially employed.

EXAMPLE 5

A mixture of 376.2 grams of phenol and 58 grams of acetone was cooled to below room temperature and 80 grams of aqueous sulphuric acid solution, of 80 per cent by weight concentration, was added. Thereafter 4 grams of hydrogen sulphide was added while maintaining the mixture at temperatures between 15° and 20° C. Crystallization was observed approximately 30 minutes after this addition. The maximum temperature of the mixture during the reaction period was about 31° C. After standing for 26 hours the mixture was treated with 166 cc. of chlorbenzene and 86 cc. of water and warmed sufficiently to melt and dissolve the same. The aqueous layer was separated and the organic layer was washed with water. The organic layer was then treated with approximately 0.5 gram of moist calcium hydroxide and heated with gradual reduction of the pressure on the system to distill water, chlorbenzene, and unreacted phenol from the bisphenol product. Distillation was continued to a point at which the residue was being heated at a temperature of 170° C. at 25 mm. absolute pressure. The residual molten product was blown with approximately 25 grams of steam while at a temperature of between 170° and 175° C. and an absolute pressure of 100 mm. There was obtained 212 grams of di(4-hydroxy-phenyl)-dimethyl methane having a freezing point of 152.5° C. The yield of said product was 92.5 per cent of theoretical, based on the acetone initially employed.

EXAMPLE 6

The experiment described in Example 5 was repeated, except that the hydrogen sulphide was omitted. All other conditions were as specified in Example 5. The yield of di-(4-hydroxyphenyl)-dimethyl methane was only 57 per cent of theoretical. The product had a freezing point of 149.7° C. and was somewhat discolored.

EXAMPLE 7

A solution of 144.2 grams (1 mole) of alpha naphthol, 29 grams (0.5 mole) of acetone, and 100 cc. of glacial acetic acid was treated with 4 grams of hydrogen sulphide and 14 grams of anhydrous hydrogen chloride. The mixture was permitted to stand at room temperature or thereabout for 22.5 hours. The reacted mixture was washed with hot water, then dissolved in 300 cc. of glacial acetic acid and the resultant solution was cooled to 30° C., whereby the product was crystallized. The crystalline product was removed, washed successively with acetic acid and water and then dried. There was obtained 87 grams of 9.9-di-methyl-3.4;5.6-dibenzo-xanthene. The yield was 50.2 per cent of theoretical, based on the actone initially employed.

EXAMPLE 8

A mixture of 406.5 grams of meta-cresol and 46.7 of acetone was treated with 9 grams of hydrogen sulphide and 23 grams of anhydrous hydrogen chloride. The resultant mixture was permitted to stand at room temperature or thereabout for 91 hours, after which it was diluted with 80 cc. of chlorbenzene and the solution was washed thoroughly with water. The mixture was then heated to distill off the water, chlorbenzene, and unreacted meta-cresol, the temperature being gradually raised and the pressure reduced until a point was reached at which the residual mixture was heated to 175° C. at 25 mm. absolute pressure. The residue was blown, while under vacuum, with approximately 25 grams of steam to remove odoriferous sulphur compounds therefrom. As the residue from these treatments there was obtained 108.8 grams of (2-isopropenyl-5-methyl phenyl) (3-hydroxy-8-p-cymyl) ether. The yield was 91 per cent of theoretical, based on the acetone initially employed.

EXAMPLE 9

A mixture of 376.2 grams of phenol and 109 grams of acetol acetate was treated with 4 grams of hydrogen sulphide and 27 grams of anhydrous hydrogen chloride. The mixture was permitted to stand at room temperature or only slightly above for 8 days, during which period it became black and quite viscous. The maximum temperature of the mixture during this period was 38° C. The product was then subjected to distillation under vacuum to remove the unreacted phenol and hydrogen chloride, whereby 201 grams of a black hard brittle resinous condensation product was obtained as the residue. This condensation product was readily soluble in hot dilute aqueous sodium hydroxide solutions.

EXAMPLE 10

A mixture of 376.2 grams of phenol and 130 grams of ethyl acetoacetate was treated with 4 grams of hydrogen sulphide and 28 grams of anhydrous hydrogen chloride while at temperatures between 8° and 14° C. The mixture was allowed to stand for 4 days at temperatures between 20° and 25° C. It was dissolved in chlorbenzene and the solution was washed with water. The solution was then distilled with gradual reduction of the pressure to remove the unreacted phenol and other volatile ingredients therefrom, leaving the condensation product as the residue. The residue was blown with steam while under vacuum to remove odoriferous sulphur compounds therefrom. There was obtained 235 grams of a phenol and ethyl acetoacetate condensation product, which product was a light brown resinous solid.

EXAMPLE 11

A mixture of 564.6 grams of phenol, 114.2 grams of acetonylacetone and 100 cc. of glacial acetic acid was treated with 4 grams of hydrogen sulphide and then saturated with anhydrous hydrogen chloride while at a temperature of approximately 8.5° C. 49 grams of hydrogen chloride was absorbed by the mixture. The resultant mixture was permitted to stand at room temperature or thereabout for 11 days. During this period it became black and viscous and was found to contain crystalline material. The mixture was diluted with 450 cc. of chlorbenzene and filtered, whereby 86 grams of crystalline 2.2.5.5-tetra-(4-hydroxy-phenyl) hexane was obtained. This compound, when purified by recrystallization from ethyl alcohol, melted at approximately 315°–316° C. The filtrate from which the crystalline 2.2.5.5-tetra-(4-hydroxy-phenyl) hexane had been separated was distilled under vacuum to remove the unreacted phenol and other low boiling ingredients, after which it was blown with steam while under vacuum. As residue there was obtained 195 grams of a hard black resious condensation product.

Other modes of applying the principle of the invention may be employed instead of those explained, change being made as regards the method herein disclosed provided the step or steps stated by any of the following claims or the equivalent of such stated step or steps be employed.

We therefore particularly point out and distinctly claim as our invention:

1. In a method wherein a phenol is reacted with a ketone in the presence of a strong mineral acid, the step of promoting the reaction by carrying it out in the presence of a sulphur compound containing a sulphur atom of valence not exceeding 2, which sulphur compound ionizes in the presence of water to form an ion having the free valence on said sulphur atom.

2. In a method of making phenol-ketone condensation products wherein a phenol is reacted with a ketone in the presence of a strong mineral acid, the step of promoting the reaction by carrying it out in the presence of a sulphur compound containing a sulphur atom of valence not exceeding 2, which sulphur compound ionizes in the presence of water to form an ion having the free valence on said sulphur atom.

3. In a method of making bis-phenols wherein a phenol is reacted with a ketone in the presence of a strong mineral acid, the step of promoting the reaction by carrying it out in the presence of a sulphur compound containing a sulphur atom of valence not exceeding 2, which sulphur compound ionizes in the presence of water to form an ion having the free valence on said sulphur atom.

4. In a method of making bis-phenols wherein a phenol is reacted with a ketone in the presence of a strong mineral acid, the step of promoting the reaction by carrying it out in the presence of hydrogen sulphide.

5. In a method of making bis-phenols by the reaction of phenols with ketones in the presence of a strong mineral acid, the steps which consist in employing at least 3 moles of the phenol per mole of the ketone and carrying the reaction out in the presence of a sulphur compound containing a sulphur atom of valence not exceeding 2, which sulphur compound ionizes in the presence of water to form an ion having the free valence on said sulphur atom.

6. The method which comprises forming a mixture of a phenol, a ketone, and hydrogen chloride and a minor proportion of a sulphur compound containing a sulphur atom of valence not exceeding 2, which sulphur compound ionizes in the presence of water to form an ion having the free valence on said sulphur atom, and permitting the mixture to stand at a reaction temperature, whereby chemical condensation of the phenol with the ketone is caused to take place.

7. In a method wherein phenol is reacted with acetone in the presence of a strong mineral acid to form di-(4-hydroxy-phenyl)-dimethyl methane, the step of carrying the reaction out in the presence of a sulphur compound containing a sulphur atom of valence not exceeding 2, which sulphur compound ionizes in the presence of water to form an ion having the free valence on said sulphur atom.

8. In a method wherein phenol is reacted with acetone in the presence of substantially anhydrous hydrogen chloride to form di-(4-hydroxy phenyl)-dimethyl methane, the step of promoting the reaction by carrying it out in the presence of hydrogen sulphide.

9. The method which comprises reacting phenol with propiophenone in the presence of hydrogen chloride and a sulphur compound containing a sulphur atom of valence not exceeding 2, which sulphur compound ionizes in the presence of water to form an ion having the free valence on said sulphur atom.

10. The method which comprises reacting ortho-phenylphenol with acetone in the presence of hydrogen chloride and a sulphur compound containing a sulphur atom of valence not exceeding 2, which sulphur compound ionizes in the presence of water to form an ion having the free valence on said sulphur atom.

11. 2.2-di-(3-phenyl-4-hydroxy - phenyl)-propane.

12. In a method wherein a phenol is reacted with a ketone in the presence of an acid-acting condensing agent, the step of promoting the reaction by carrying it out in the presence of hydrogen sulphide.

13. In a method wherein a phenol is reacted with a ketone in the presence of an acid-acting condensing agent, the step of promoting the reaction by carrying it out in the presence of hydrogen sulphide in amount corresponding to at least 0.03 of the molecular equivalent of the ketone reactant.

14. In a method of making bis-phenols wherein a phenol is reacted with a ketone in the presence of hydrogen chloride, the step which consists in carrying the reaction out in the presence of hydrogen sulphide in amount corresponding to at least 0.03 of the molecular equivalent of the ketone reactant.

15. In a method of making di-(4-hydroxy-phenyl)-dimethyl methane wherein phenol is reacted with acetone in the presence of an acid-acting condensing agent, the step of promoting the reaction by carrying it out in the presence of hydrogen sulphide.

16. In a method of making di-(4-hydroxy-phenyl)-dimethyl methane wherein phenol is reacted with acetone in the presence of a strong mineral acid, the step of promoting the reaction by carrying it out in the presence of hydrogen sulphide in amount corresponding to at least 0.03 of the molecular equivalent of the acetone reactant.

RALPH P. PERKINS.
FRED BRYNER.